(12) United States Patent
Melkote et al.

(10) Patent No.: US 6,999,267 B1
(45) Date of Patent: Feb. 14, 2006

(54) METHOD FOR ITERATIVELY DETERMINING REPEATABLE RUNOUT CANCELLATION VALUES IN A MAGNETIC DISK DRIVE

(75) Inventors: Hemant Melkote, San Jose, CA (US); Zhi Wang, San Jose, CA (US)

(73) Assignee: Western Digital Technologies, Inc., Lake Forest, CA (US)

(*) Notice: Subject to any disclaimer, the term of this patent is extended or adjusted under 35 U.S.C. 154(b) by 116 days.

(21) Appl. No.: 10/835,446

(22) Filed: Apr. 28, 2004

(51) Int. Cl.
*G11B 5/596* (2006.01)

(52) U.S. Cl. .................................. 360/77.04

(58) Field of Classification Search ............ 360/77.04, 360/75, 77.02, 77.07, 77.08
See application file for complete search history.

(56) References Cited

U.S. PATENT DOCUMENTS

| | | | |
|---|---|---|---|
| 5,875,066 A * | 2/1999 | Ottesen ........................ | 360/75 |
| 5,926,338 A * | 7/1999 | Jeon et al. ................. | 360/77.04 |
| 6,061,200 A | 5/2000 | Sheperd et al. .......... | 360/77.04 |
| 6,115,203 A | 9/2000 | Ho et al. ................. | 360/77.04 |
| 6,141,175 A | 10/2000 | Nazarian et al. ......... | 360/77.04 |
| 6,292,324 B1 | 9/2001 | Ho et al. ................. | 360/77.04 |
| 6,310,742 B1 | 10/2001 | Nazarian et al. ......... | 360/77.04 |
| 6,437,936 B1 | 8/2002 | Chen et al. ............... | 360/77.04 |
| 6,487,035 B1 * | 11/2002 | Liu et al. .................. | 360/77.04 |
| 6,545,835 B1 | 4/2003 | Codilian et al. ......... | 360/77.04 |
| 6,563,663 B1 | 5/2003 | Bi et al. ................... | 360/77.04 |
| 6,831,803 B1 * | 12/2004 | Hsin ....................... | 360/77.04 |
| 6,847,502 B1 * | 1/2005 | Codilian .................. | 360/77.04 |

OTHER PUBLICATIONS

"Median Selection of Position Error Signals in a Data Recording Disk File," May 1987, IBM TDB vol. 29, No. 12, pp. 5239-5240.*

* cited by examiner

*Primary Examiner*—David Hudspeth
*Assistant Examiner*—James L Habermehl
(74) *Attorney, Agent, or Firm*—Robroy R. Fawcett, Esq.

(57) ABSTRACT

The present invention may be embodied in a method of determining a repeatable runout (RRO) compensation value set for a data track on a magnetic disk in a disk drive. The track comprises a plurality of embedded sectors that define a circumferential path having RRO requiring compensation during data read and write operation. In the method, track following is performed along the track and a position error signal (PES) is determined for each servo sector. An RRO compensation value is iteratively learned for each servo sector using the previously learned value for the servo sector and using the PES for the servo sector and for adjacent servo sectors.

9 Claims, 5 Drawing Sheets

IDEAL SERVO TRACKS

WRITTEN SERVO TRACKS

METHOD FOR ITERATIVELY DETERMINING REPEATABLE RUNOUT CANCELLATION VALUES IN A MAGNETIC DISK DRIVE

BACKGROUND OF THE INVENTION

1. Field of the Invention

The present invention relates to rotating magnetic disk drives, and more particularly, to a method for iteratively determining repeatable runout written to a servo track during a servowriting process for accurate track following relative to a concentric track center.

2. Description of the Prior Art and Related Information

Repeatable runout (RRO) in a disk drive results from imperfections, with respect to a perfect circle, in the location of servo information along a track on a disk surface in the disk drive. Due to disk spindle rotation, the servo imperfections due to RRO are periodic having a fundamental frequency that is equal to the spindle rotation frequency. The RRO imperfections are relatively static over time and the effect of the RRO may be attenuated by measuring the RRO during manufacturing and using the RRO measurements in a head-position servo loop to compensate for the RRO effect.

U.S. Pat. No. 6,563,663 discloses a scheme for determining RRO compensation values using Iterative Learning Control (ILC) based on an update law having a digital filter. However, acceptable RRO compensation values are obtained after numerous disk rotations using the digital filter based ILC and update law. The numerous disk rotations unfortunately impact disk drive manufacturing throughput.

Accordingly, there exists a need for a technique for iteratively determining RRO cancellation values in a disk drive without unnecessarily increasing manufacturing costs or significantly impacting manufacturing throughput. The present invention satisfies these needs.

SUMMARY OF THE INVENTION

The present invention may be embodied in a method of determining a repeatable runout (RRO) compensation value set for a data track on a magnetic disk in a disk drive. The track comprises a plurality of embedded sectors that define a circumferential path having RRO requiring compensation during data read and write operation. In the method, track following is performed along the track and a position error signal e is determined for each servo sector t. An RRO compensation value u is iteratively learned for each servo sector t of the track based on the equation:

$$u_k(t-M) = u_{k-1}(t-M) + \sum_{i=0}^{M} \alpha_i e_{k-1}(t-(M-i))$$

where k is a disk revolution number during track following, $\alpha_i$ are learning gain coefficients, and M is greater than or equal to 2 and less than a total number N of servo sectors for the track.

In more detailed features of the invention, the iterative learning may be completed using 5 disk revolutions. Advantageously, M is equal to 3, $\alpha_0$ is equal to about $1/32$, $\alpha_1$ is equal to about $1/16$, $\alpha_2$ is equal to about $1/16$, and $\alpha_3$ is equal to about $-1/8$. Alternatively, M may have a value that is less than 9, such as 7.

BRIEF DESCRIPTION OF THE DRAWINGS

The accompanying drawings illustrate embodiments of the present invention and, together with the description, serve to explain the principles of the invention.

DETAILED DESCRIPTION

Figure 1:
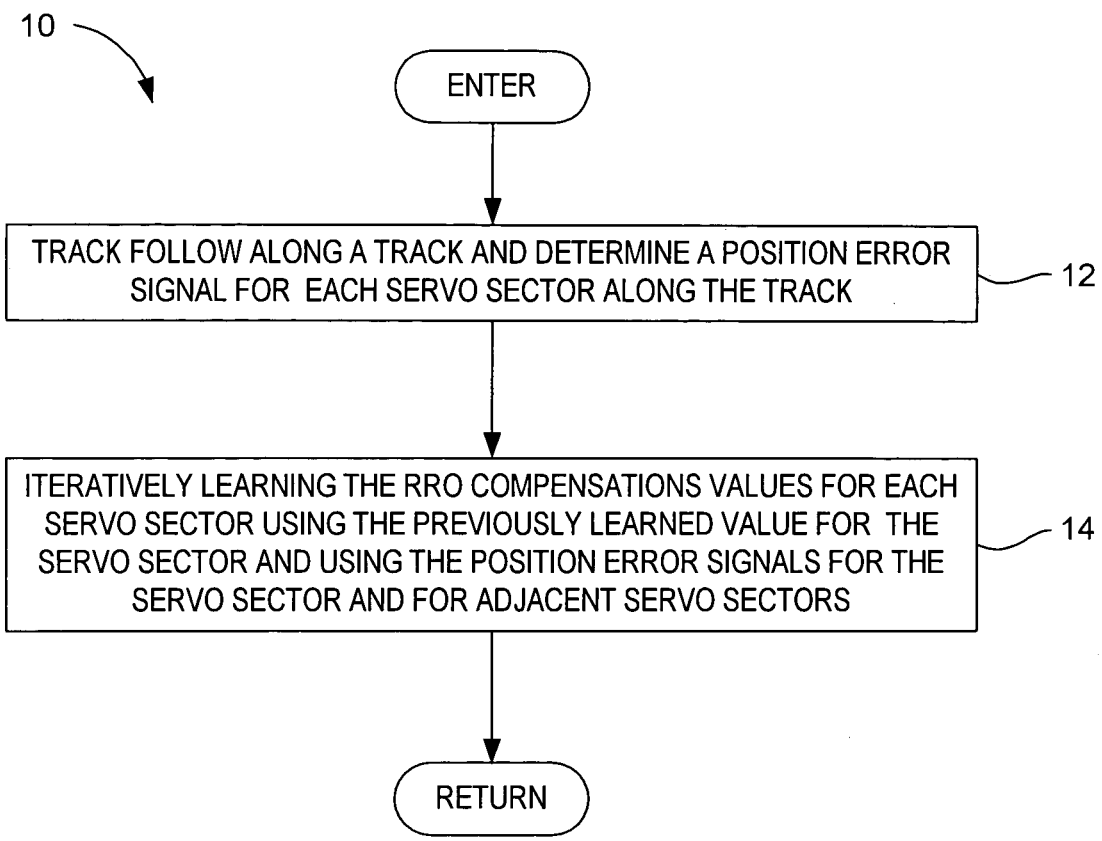
FIG. 1 is a flow chart illustrating a method for iteratively determining repeatable runout (RRO) cancellation values in a magnetic disk drive, according to the present invention.
Figure 2:
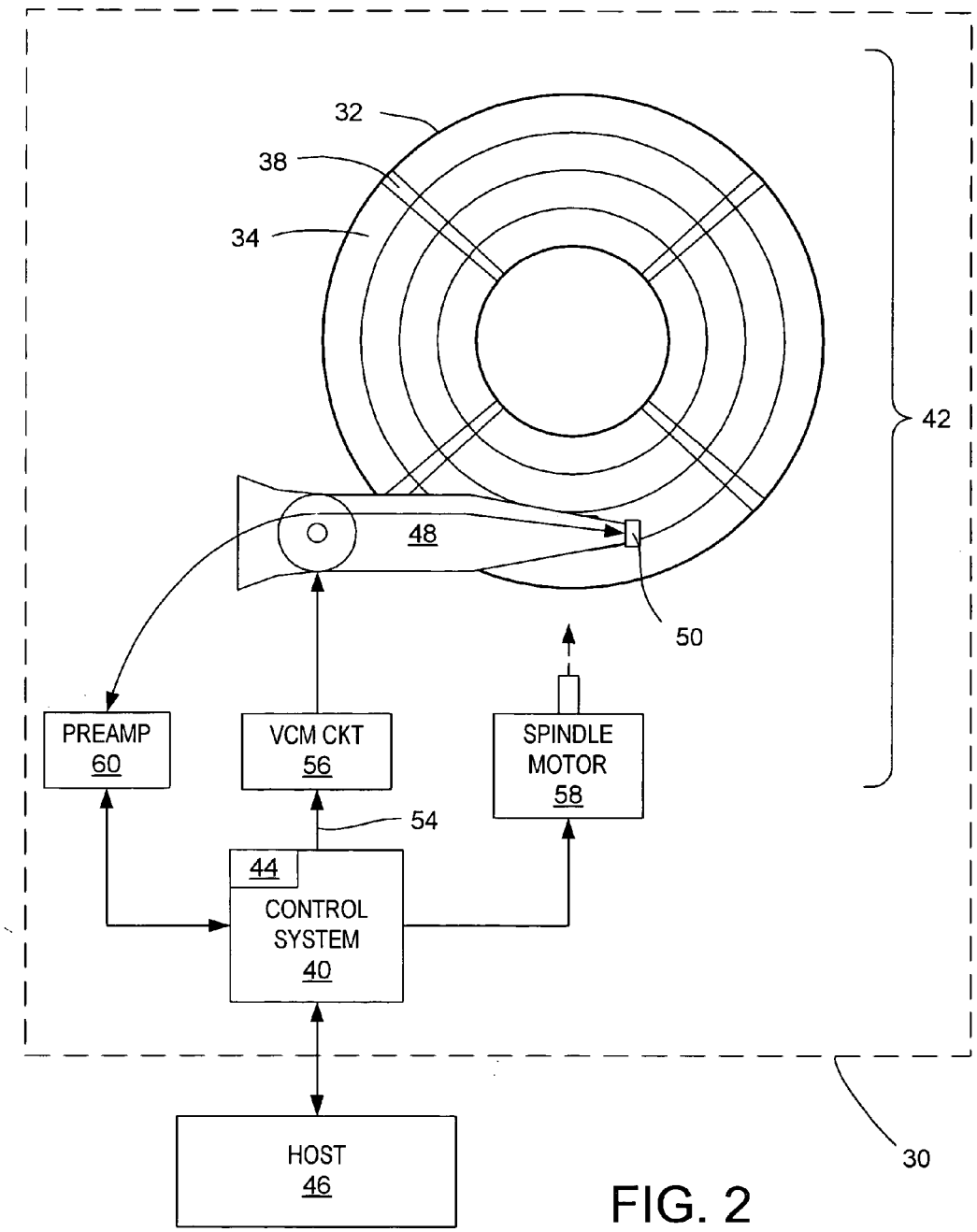
FIG. 2 is a block diagram of a computer system having a disk drive for implementing the iteratively determining method of FIG. 1.
Figure 3:
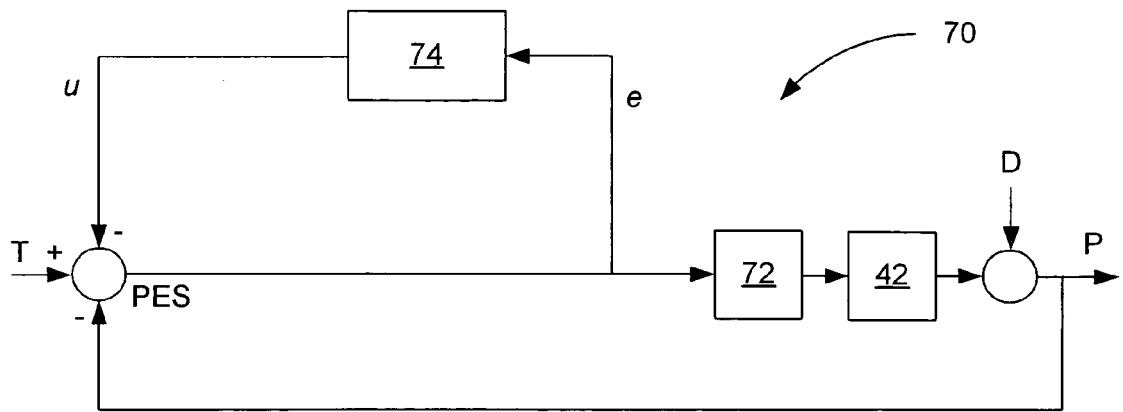
FIG. 3 is a block diagram of a servo control loop, within the disk drive of FIG. 2, for implementing the iteratively determining method of FIG. 1.

With reference to FIGS. 1–3, the present invention may be embodied in a method 10 (FIG. 1) of determining a repeatable runout (RRO) compensation value set for a data track 34 on a magnetic disk 32 in a disk drive 30 (FIG. 2). The track comprises a plurality of embedded sectors 38 that define a circumferential path having RRO requiring compensation during data read and write operations. In the method, track following is performed along the track and a position error signal (PES) e is determined for each servo sector t (block 12). An RRO compensation value (RC) u is iteratively learned for each servo sector t of the track based on the equation:

$$u_k(t-M) = u_{k-1}(t-M) + \sum_{i=0}^{M} \alpha_i e_{k-1}(t-(M-i)) \qquad (1)$$

where k is a disk revolution number during track following, $\alpha_i$ are learning gain coefficients, and M is greater than or equal to 2 and less than a total number N of servo sectors for the track (block 14).

The iterative learning may be completed using 5 disk revolutions. Advantageously, M is equal to 3, $\alpha_0$ is equal to about $1/32$, $\alpha_1$ is equal to about $1/16$, $\alpha_2$ is equal to about $1/16$, and $\alpha_3$ is equal to about $-1/8$. Alternatively, M may have a value that is less than 9, such as 7.

Empirical results have indicated that the PES variance for a track 34 may be reduced by about 35% to 50% using RRO correction values iteratively determined based on 5 disk rotations. In contrast, using a digital filter, similar PES variance reductions were found to require about 20 disk rotations.

Figure 6A:
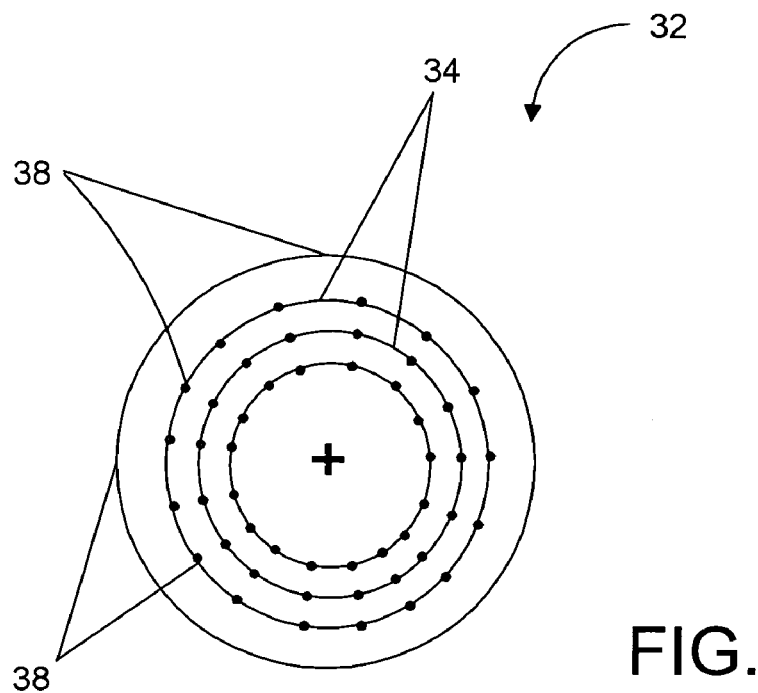
FIG. 6A is a schematic diagram illustrating ideal servo sector tracks on a disk of a disk drive.
Figure 6B:
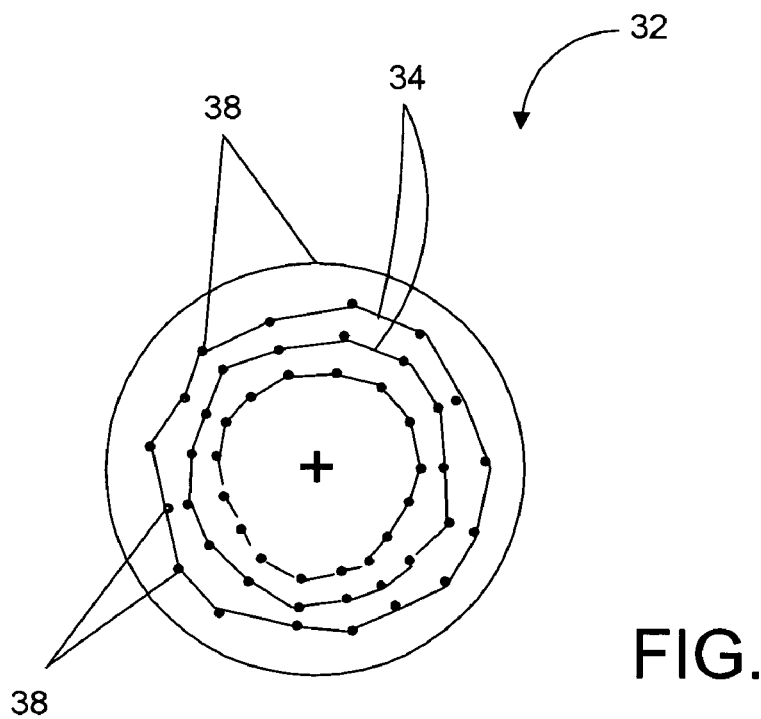
FIG. 6B is a schematic diagram illustrating written servo sector tracks exhibiting RRO.

An ideal track 34 is one that forms a perfect circle on the disk 32 as shown in FIG. 6A. During manufacture, servo information for the embedded servo sectors 38 is placed on the disk during a servo writing operation. The servo information includes servo bursts 38 that are placed at locations that deviate outwardly or inwardly from the ideal "center line" of the track circle as shown in FIG. 6B. These apparent deviations from the ideal track centerline can occur due to spindle runout, vibrations or movements during servo writing operation, and media defects or noise in the region of the servo bursts.

Cancellation of the wedge RRO, which may constitute nearly 50% of total PES variance, is desired to improve drive performance and achieve higher track densities. Details of particular properties, sources, and aspects of RRO in a magnetic disk drive 30, and techniques for canceling the RRO using the RRO correction values RC, are provided in U.S. Pat. Nos. 6,141,175 and 6,545,835, which are incorporated herein by reference.

The disk drive 30 (FIG. 2) includes a control system 40 and a head disk assembly (HDA) 42. The control system includes a sampled servo controller 44, and circuitry and processors that control the HDA and that provide an intelligent interface between a host 46 and the HDA for execution of read and write commands. The control system may have an internal microprocessor and nonvolatile memory for implementing the techniques of the invention. Program code for implementing the techniques of the invention may be stored in the nonvolatile memory and transferred to volatile random access memory (RAM) for execution by the microprocessor. The HDA includes the rotating disk 32 having distributed position information in a plurality of uniformly spaced-apart servo wedges having the embedded servo sectors 38, and includes an actuator 48 for positioning a transducer head 50 in response to a control effort signal 54 applied to a voice coil motor (VCM) circuit 56 that includes a voice coil motor coupled to the actuator. The transducer head periodically reads the position information from the servo wedges. The sampled servo controller periodically adjusts the control effort signal during a track following operation based on the position information. The HDA further includes a spindle motor 58 and a preamplifier 60.

Figure 4:
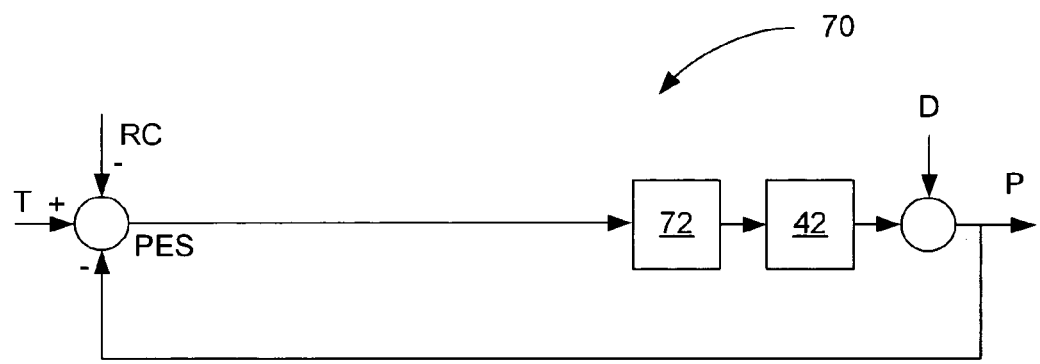
FIG. 4 is a block diagram of a servo control loop, within the disk drive of FIG. 2, for using the RRO values iteratively determined by the method of FIG. 1.

With reference to FIGS. 3 and 4, a servo control loop 70 for iteratively determining the RRO cancellation values RC includes the HDA 42 after a track following compensator 72 implemented by the sampled servo controller 44. During track following, disturbances D to the HDA alter the resulting head position P. The head position P is compared to a track selection signal T, and the RRO cancellation values are subtracted, to generate the PES. The RRO cancellation values estimate the RRO's effect on the head position, and once determined during the disk drive's initial burn in process, are stored in an RRO compensation nonvolatile memory, or stored on the disk 32, and loaded into an RRO compensation table in volatile memory for use during track-following operations. The track following compensator 72 uses the PES to follow a track's centerline. For iteratively learning the RRO cancellation values, an array of length equal to the total number N of servo sectors 38 (or wedges) in the disk drive 30 is stored in memory. A single element of the array stores the estimated RRO compensation value u for a particular servo sector t and is updated every PES sample. In accordance with Equation 1, the PES value for the particular sector and for adjacent previous servo sectors are used for learning the RRO compensation values. The RRO learning process repeats for a prescribed number of spindle revolutions, or until a certain reduction in RRO is achieved. After learning is complete, the RRO compensation values are used to cancel the RRO during track-following operations (FIG. 4).

Figure 5:
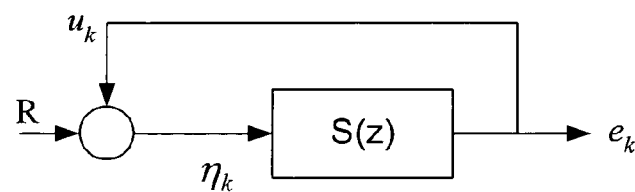
FIG. 5 is a block diagram of a state model of the servo control loop of FIG. 3.

A block diagram for modeling the servo control loop 70 is shown in FIG. 5. A reference R and the estimated RRO compensation values are added to the PES and filtered by a sensitivity transfer function S(z), which is stable when the servo loop is stable. For clarity, other track mis-registration (TMR) sources are not shown.

The PES on revolution "k" is denoted by $e_k$. The state space matrices of the sensitivity function are denoted by a quadruple $(A_p, B_p, C_p, D_p)$, and its states are denoted by $x_k$. From FIG. 5, Equations 2 are obtained $$x_k(t+1) = A_p x_k(t) + B_p \eta_k(t)$$

$$e_k(t) = C_p x_k(t) + D_p \eta_k(t) \qquad (2)$$

with $A_p \in \mathfrak{R}^{n \times n}$, $B_p \in \mathfrak{R}^{n \times 1}$, $C_p \in \mathfrak{R}^{1 \times n}$, $D_p \in \mathfrak{R}$. The index k denotes the disk revolution while the index t denotes the servo sample (or wedge). Define $$\eta_k = \begin{bmatrix} \eta_k(0) \\ M \\ \eta_k(N-1) \end{bmatrix}, \quad e_k = \begin{bmatrix} e_k(0) \\ M \\ e_k(N-1) \end{bmatrix} \qquad (3)$$

where N is the total number of sectors (or wedges). Note that the reference R is periodic with period N. Equation 2 may be written as $$e_k = H_p \eta_k + \Gamma_p x_k(0) \qquad (4)$$

where $$H_p = \begin{bmatrix} D_p & 0 & L & 0 \\ C_p B_p & D_p & & 0 \\ M & & O & \\ C_p A_p^{N-2} B_p & C_p A_p^{N-3} B_p & L & D_p \end{bmatrix} \in \mathfrak{R}^{N \times N}, \qquad (5)$$

$$\Gamma_p = \begin{bmatrix} C_p \\ M \\ C_p A_p^{N-1} \end{bmatrix} \in \mathfrak{R}^{N \times 1}.$$

Since $\eta_k = R - u_k$, then $$\eta_{k+1} - \eta_k = u_k - u_{k+1}. \qquad (6)$$

Choosing the update law $$u_{k+1} = u_k + K e_k \qquad (7)$$

and substituting in Equation 5 gives $$\eta_{k+1} - \eta_k = -K e_k \qquad (8)$$

Substituting for $e_k$ from Equation 4 into Equation 8 gives $$\eta_{k+1} = (I - K H_p) \eta_k - K \Gamma_p x_k(0). \qquad (9)$$

To complete the model, the dynamics of the initial condition of the sensitivity function are formulated as follows: since the states of the sensitivity function are not reset every iteration (as commonly done in iterative learning control (ILC)), the initial condition of the sensitivity function on the next disk revolution (or iteration) may be written in terms of the initial condition on the current disk revolution as follows:

$$x_{k+1}(0) = A_p^N x_k(0) + \lambda \eta_k$$

$$\lambda = [A_p^{N-1} B_p A_p^{N-2} B_p L B_p]. \tag{10}$$

Hence, the system dynamics in ILC may be written as follows:

$$\begin{bmatrix} \eta_{k+1} \\ x_{k+1}(0) \end{bmatrix} = \begin{bmatrix} I - KH_p & -KT_p \\ \lambda & A_p^N \end{bmatrix} \begin{bmatrix} \eta_k \\ x_k(0) \end{bmatrix} \tag{11}$$

and the output equation given by $$e_k = [H_p \ \Gamma_p] \begin{bmatrix} \eta_k \\ x_k(0) \end{bmatrix}. \tag{12}$$

For convergence of the learning, it is required that the gain matrix K be chosen such that the eigenvalues of the matrix $$\overline{A} = \begin{bmatrix} I - KH_p & -KT_p \\ \lambda & A_p^N \end{bmatrix} \in \Re^{(N+n) \times (N+n)} \tag{13}$$

lie inside the unit circle. Since $$\overline{A} = \begin{bmatrix} I & 0 \\ \lambda & A_p^N \end{bmatrix} - \begin{bmatrix} I \\ 0 \end{bmatrix} K [H_p \ \Gamma_p] \tag{14}$$

the choice of a suitable gain matrix K is equivalent to stabilizing the multi-input, multi-output (MIMO) system $$\chi_{k+1} = \begin{bmatrix} I & 0 \\ \lambda & A_p^N \end{bmatrix} \chi_k + \begin{bmatrix} I \\ 0 \end{bmatrix} \mu_k \quad \chi_k \in \Re^{(N+n)}, \mu_k \in \Re^N \tag{15}$$

$$\Upsilon_k = [H_P \ \Gamma_P] \chi_k \qquad \Upsilon_k \in \Re^N$$

using static output feedback, i.e., $$\mu_k = -K \Upsilon_k. \tag{16}$$

Several different methods are available for pole placement via static output feedback. A simple and practical method is described.

In the general case, the matrix K is fully populated, and the update law for each wedge is given by $$u_{k+1}(t) = u_k(t) + \sum_{j=1}^{N} K_{tj} e_k(t) \tag{17}$$

where $K_{tj}$ is the (t,j)'th element of the K matrix. Hence, the update value for a wedge depends on the PES values on all wedges on the previous disk revolution during track following. It may be cumbersome to implement this since the whole matrix K as well the PES on the previous revolution needs to be stored in memory. A simpler update law gives good improvement in the RRO:

$$u_{k+1}(t) = u_k(t) + \alpha_0 e_k(t) + \alpha_1 e_k(t+1) + \alpha_2 e_k(t+2) + \alpha_3 e_k(t+3) \tag{18}$$

with $\alpha_j$, j=0 to 3 being suitable coefficients. This corresponds to the gain matrix K being given by $$K = \begin{bmatrix} \alpha_0 & \alpha_1 & \alpha_2 & \alpha_3 & K & 0 \\ 0 & \alpha_0 & \alpha_1 & \alpha_2 & O & M \\ 0 & 0 & \alpha_0 & \alpha_1 & O & \alpha_3 \\ 0 & 0 & 0 & \alpha_0 & O & \alpha_2 \\ M & M & O & O & O & \alpha_1 \\ \alpha_1 & \alpha_2 & \alpha_3 & K & 0 & \alpha_0 \end{bmatrix}. \tag{19}$$

Hence, only 4 coefficients and 4 PES values need to be stored in memory. The actual implementation of Equation 18 would be $$u_k(t-3) = u_{k-1}(t-3) + \alpha_0 e_{k-1}(t-3) + \alpha_1 e_{k-1}(t-2) + \alpha_2 e_{k-1}(t-1) + \alpha_3 e_{k-1}(t) \tag{20}$$

where $e_{k-1}(t)$ is the PES on wedge t from the previous rev (i.e., k-1), $e_{k-1}(t-1)$ is the PES on wedge (t-1) from the previous rev and so on, $u_{k-1}(t-3)$ is the previous learned value of wedge (t-3), and $u_k(t-3)$ is its updated (current) value. In other words, on wedge t, $u_k(t)$ is subtracted from the PES while $u_k(t-3)$ is updated according to Equation 20. The coefficients may change from radial-track zone to zone depending on the ratio of RRO to nonrepeatable runout (NRRO) and could also be a function of the learning revolution (i.e., k.)

A maximum useful number of coefficients selected may be related to the order of the sensitivity transfer function. For example, for an eighth order sensitivity transfer function, then $\alpha_j$, j=0 to 7 may be suitable. This number of coefficients is a small percentage of the total number N (commonly over 100) of sector sectors 38 on a track 34.

Figure 7:
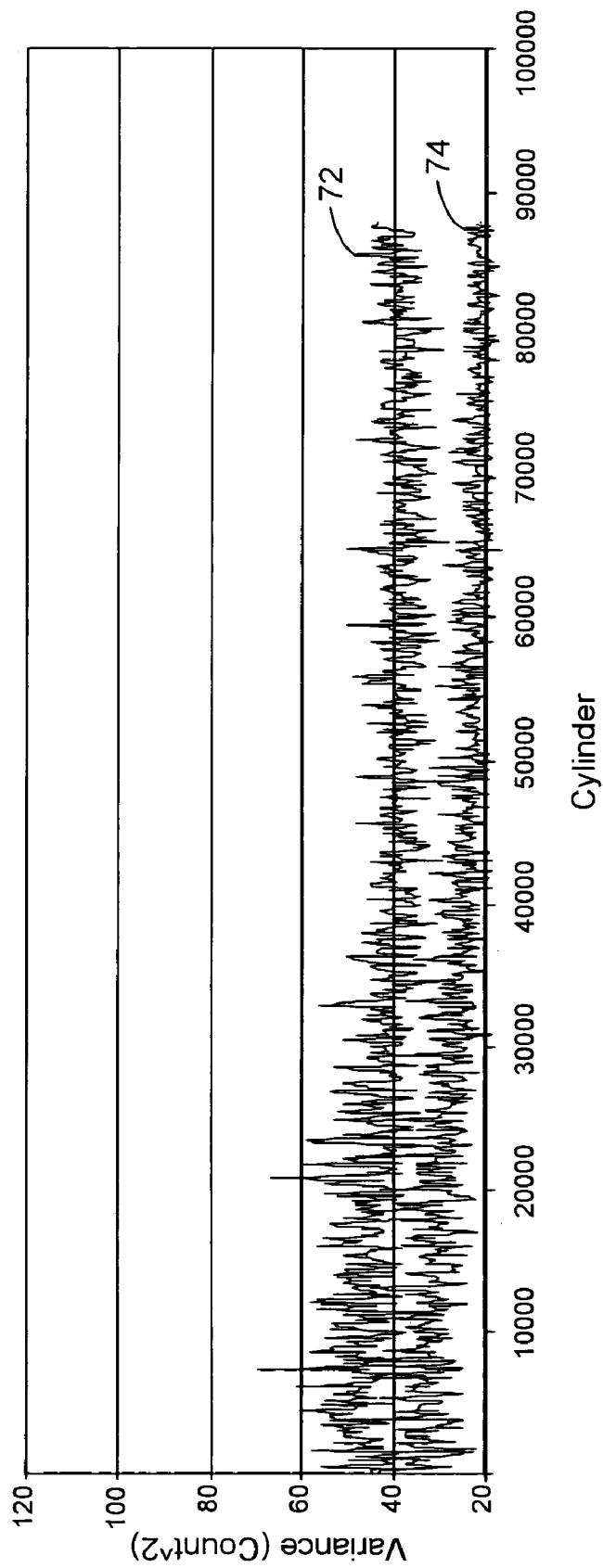
FIG. 7 is a graph showing PES variance versus track number for track following without and with RRO compensation.

FIG. 7 shows a graph of PES variance versus cylinder track number in a disk drive 30 without ILC (trace 72), and with ILC in accordance with Equation 20 for 5 disk revolutions of learning (trace 74). The PES variance is reduced by about 35–50% with the learning. A reduction of more than 50% in the PES variance may be achieved if the NRRO is small.

What is claimed is:

1. A method of determining a repeatable runout (RRO) compensation value set for a data track on a magnetic disk in a disk drive, wherein the track comprises a plurality of embedded sectors that define a circumferential path having RRO requiring compensation during data read and write operation, the method comprising:
   track following along the track and determining a position error signal e for each servo sector t,
   iteratively learning a RRO compensation value u for each servo sector t of the track based on the equation:

$$u_k(t-M) = u_{k-1}(t-M) + \sum_{i=0}^{M} \alpha_i e_{k-1}(t-(M-i))$$

where
   k is a disk revolution number during track following,
   $\alpha_i$ are learning gain coefficients, and
   M is greater than or equal to 2 and less than a total number N of servo sectors for the track.

2. A method of determining a repeatable runout (RRO) compensation value set as defined in claim 1, wherein the iterative learning is completed using 5 disk revolutions.

3. A method of determining a repeatable runout (RRO) compensation value set as defined in claim 1, wherein M is equal to 3.

4. A method of determining a repeatable runout (RRO) compensation value set as defined in claim 3, wherein $\alpha_0$ is equal to about $\frac{1}{32}$, $\alpha_1$ is equal to about $\frac{1}{16}$, $\alpha_2$ is equal to about $\frac{1}{16}$, and $\alpha_3$ is equal to about $-\frac{1}{8}$.

5. A method of determining a repeatable runout (RRO) compensation value set as defined in claim 1, wherein M is equal to 7.

6. A method of determining a repeatable runout (RRO) compensation value set as defined in claim 1, wherein M is less than 9.

7. A method of determining a repeatable runout (RRO) compensation value set for a data track on a magnetic disk in a disk drive, wherein the track comprises a plurality of embedded sectors that define a circumferential path having RRO requiring compensation during data read and write operation, the method comprising:

track following along the track and determining a position error signal e for each servo sector t, iteratively learning the RRO compensation value u for each servo sector t of the track based on the equation:

$$u_k(t-3)=u_{k-1}(t-3)+\alpha_0 e_{k-1}(t-3)+\alpha_1 e_{k-1}(t-2)+\alpha_2 e_{k-1}(t-1)+\alpha_3 e_{k-1}(t)$$

where
   k is the disk revolution number during track following, and
   $\alpha_0$, $\alpha_1$, $\alpha_2$, and $\alpha_3$ are learning gain coefficients.

8. A method of determining a repeatable runout (RRO) compensation value set as defined in claim 7, wherein $\alpha_0$ is equal to about $\frac{1}{32}$, $\alpha_1$ is equal to about $\frac{1}{16}$, $\alpha_2$ is equal to about $\frac{1}{16}$, and $\alpha_3$ is equal to about $-\frac{1}{8}$.

9. A method of determining a repeatable runout (RRO) compensation value set as defined in claim 7, wherein the iterative learning is completed using 5 disk revolutions.

* * * * *